July 31, 1945.   L. R. NEWTON   2,380,910
SHAKING AND CONVEYING MACHINE
Filed Feb. 6, 1942

ATTEST:
Wm. C. Meiser

Lowell R. Newton
INVENTOR

BY
R. S. Story
ATTORNEY

Patented July 31, 1945

2,380,910

UNITED STATES PATENT OFFICE 2,380,910

SHAKING AND CONVEYING MACHINE

Lowell R. Newton, Chicago, Ill., assignor to Industrial Patents Corporation, Chicago, Ill., a corporation of Delaware Application February 6, 1942, Serial No. 429,709

5 Claims. (Cl. 198—106)

This invention relates to a machine for compacting a material in a container, and more particularly provides a mechanism for jarring air bubbles out of a viscous material placed within a container.

It is an object of this invention to provide a means for placing a viscous material in a glass container in a more attractive manner by jarring the container to drive the air bubbles away from the wall of the container.

It is another object of this invention to provide a means for jarring the air out of the viscous material in a container while simultaneously conveying the container lengthwise of the jarring apparatus.

It is another object of this invention to provide a conveying apparatus for materials which must be compacted within a container.

Other objects will appear from the description given below.

In packaging materials such as peanut butter and jelly in glass containers, air bubbles are quite frequently entrained with the material. Such bubbles may form against the glass wall and a non-uniform and unattractive packaging thereof results which may lead the customer to the conclusion that the package is not completely full.

To avoid these difficulties in the past, it has been the practice to manually jar the container several times against a hard surface to cause the viscous material to flow against the wall of the container to displace any air from the pockets which may be present. The material may be compacted to a certain extent thus driving the entrained air upwardly as the material settles into the container and in any event, when the container is jarred appropriately the air bubbles are driven inwardly as the material takes a position around the glass wall so that upon inspecting the package, no voids are visible.

The present invention was made to obviate the necessity of manually jarring the containers and provides means for simultaneously vibrating the containers while conveying them into proper position for the subsequent capping operation.

Figure 1:
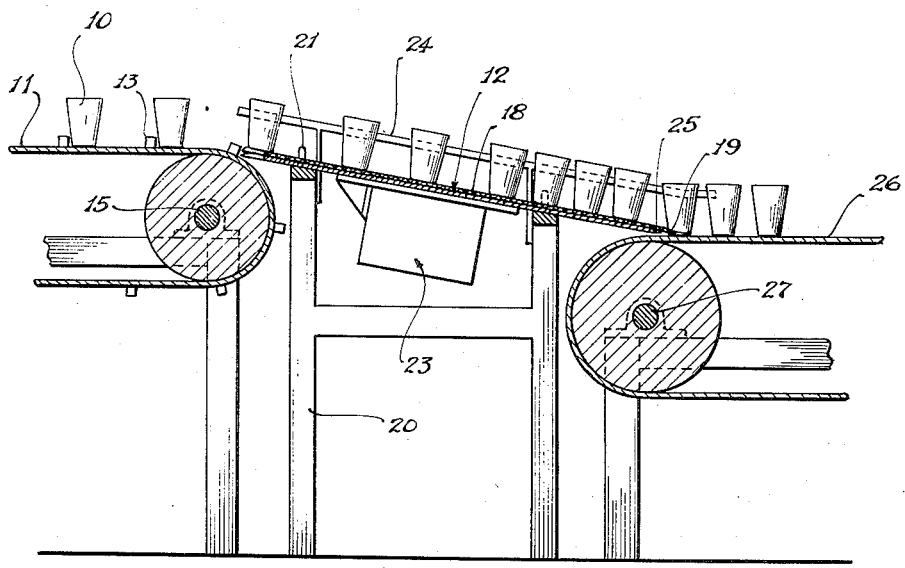
Figure 1 is a sectional side elevation showing the essential elements of this invention.
Figure 2:
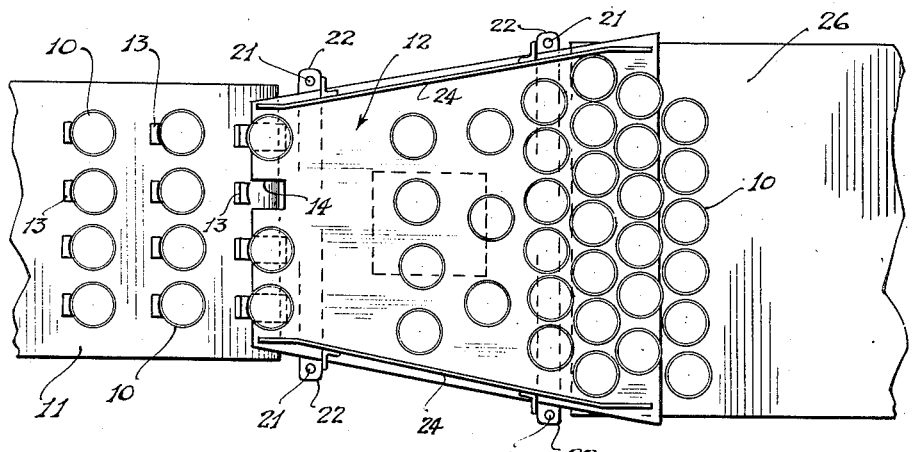
Figure 2 is a plan view of the arrangement of the conveyor system and shaking mechanism here disclosed.

As shown in Figures 1 and 2, the containers 10, filled with a material which may require compacting, are delivered by a conveyor 11 to the inclined chute 12. The conveyor 11 has lugs 13 for engaging behind the containers 10 to force them onto the chute 12, and as shown in Figure 2, the inlet end of the chute 12 is provided with suitable notches 14 through which the lugs 13 may pass as conveyor 11 travels around the bearing 15. The conveyor 11 may be driven in any suitable manner.

The chute 12 is inclined as indicated in Figure 1 and may be provided with any suitable surface which will have very little friction with the bottom of the container. In the preferred construction, a canvas sheet 18 affixed to the floor of the chute by a rubber adhesive, has been found most effective to provide the proper frictional surface and to eliminate undue noise. If a canvas surface is used, the canvas may extend freely as at 19 past the lower end of chute 12 onto a conveyor for a purpose that will appear below.

The floor of chute 12 is mounted on standards 20 in a manner whereby it may be vibrated, and, as here shown, the standards 20 carry pins 21 on their upper ends over which apertures in ears 22 are loosely positioned. The ears 22 are integral with chute 12 so that the chute may be vibrated yet pins 21 constrain the chute to its proper operative position.

The floor 12 has a vibrator 23 fixedly secured to the underside thereof whereby the chute may be vibrated and impulses perpendicular to the plane of the floor are given the chute to accomplish the desired results. The feed chute also has rails 24 on each side to confine the containers to the chute as is seen in Figure 2.

The lower end of the feed chute delivers onto an endless conveyor for carrying the containers to a capping mechanism and this lower end is beveled to have a sharp angle 25 which cooperates with the free end portion 19 of the canvas to deliver the containers onto the conveyor 26 in a relatively smooth fashion. The free end of the canvas should overlay the conveyor 26 only a short distance and preferably this distance is less than the least dimension of the bottom of the container. The canvas is, of course, jiggled with the chute and the containers tend to work off its free end onto the conveyor merely by this action alone. However, if the chute is full of containers, the pressure of those banked up behind will push all of the containers onto the conveyor 26. Conveyor 26 is carried by suitable means rotatably supported in bearings 27 and should be driven at a speed slow enough to cause the containers to bunch up at the end of the chute 12, yet fast enough to insure that the full capacity of the chute is utilized.

The vibrator 23 is positioned to drive the floor 12 as above stated to effect the compacting of the viscous material in the container and the sharp blow given the container, acting against the inertia of the viscous material, causes it to take the form of the container thus driving the air bubbles into the mass of the material. In this manner, a much neater package is produced wherein all of the air bubbles are removed from the surface of the glass container and the compaction of the material is obtained by a multitude of sharp blows as distinguished from one or two heavy manual blows such as is now done to obtain the same results, thus minimizing the chances of breakage. Any well known vibrator mechanism may be used but it is preferred that an electromagnetic device working against the inertia of the armature of an electromagnet be used. With such a device, the amplitude and frequency of the vibrations may be controlled, and this type of mechanism is readily available on the market in many forms.

Chute 12 being inclined, as the containers are agitated on its surface, they will move downwardly as indicated in Figure 1. While the containers would move downwardly over most any surface on the inclined chute 12, this surface is generally designed to have a minimum of friction so that there will be no tendency to tip over the containers which in some cases are relatively top heavy. The loose fitting connection between the apertures in ears 22 and pins 21 permit the chute 12 to be vibrated to the desired extent, and the amount of energy expended upon the vibrating chute depends upon the viscosity of the material and the shape and size of the container. The chute 12 may be braced on its underside in any manner required to support the weight of the containers flowing down its upper surface.

The chute 12 is designed to deliver containers from the conveyor 11 to the slower moving conveyor 26, and the containers pile up at the lower end of the chute 12 before moving onto the latter conveyor. The containers dancing down the upper surface of the chute bunch-up as shown in Figure 2 and the containers generally move onto the conveyor 26 in a fixed pattern as shown in Figure 2, so that any required operation can be performed. In some instances, a haphazard arrangement results, but it is readily apparent that any number of well known means could be associated with conveyor 26 to cause containers so deposited to be taken therefrom in an orderly manner.

The conveyor 26 must have a capacity equal to that of conveyor 11 otherwise the containers would back up to the inlet of chute 12, thus slowing up the operation of this machine by requiring a shutting down of the conveyor 11 until the surplus could be carried away by conveyor 26. In order to obtain the piling up which knocks the containers into the fixed pattern, the containers are jiggled down the inclined chute at a faster rate than conveyor 11 supplies them and the containers bump themselves into proper alignment to fill the chute between the rails. It is this action that causes the containers to assume the desired pattern of Figure 2 and conveyor 26 merely removes the rows of containers which have been worked into proper position by the vibration of the chute.

From the description given above it is seen that the filled containers delivered from the filling machine are placed upon the upper end of chute 12 by conveyor 11. The vibrator 23 energizes the chute 12 to cause the material to be compacted and thus to squeeze out the air bubbles or to cause the viscous material to flow against the wall of the container. While compacting the viscous material, the motion of chute 12 also causes the containers to be conveyed downwardly to subsequently issue onto the conveyor 26. The inclination of the chute, the magnitude of the vibrating or jarring motions, and the frictional surface of the chute 12 are selected by choice to insure that sufficient energy will be imparted to the container to cause the material to be compacted as indicated above. The rails 24 of the chute confine the containers to direct them into the rows which are delivered to conveyor 26. This construction provides a compacting means and a conveyor and container positioning means which can handle any size conveyor without adjustment other than is necessary to control the vibrations imparted to the chute.

While the above is the preferred embodiment of this invention, many modifications will appear to those skilled in the art, all of which are contemplated to be within the scope of the invention as defined in the claims below.

I claim:

1. A machine for compacting a material in a container and conveying the container along its path comprising a conveyor to feed a predetermined number of filled containers per minute, an inclined chute to receive said filled containers, a canvas surface affixed to said chute, said canvas surface extending beyond the lower end of said chute, said chute having rails provided on each side thereof, means to vibrate said chute at a speed to cause the containers to move over its surface, said chute being inclined at an angle whereby more than said predetermined number of containers will pass down its surface per minute, a conveyor means to receive the containers passing from said chute, said extending canvas surface overlaying said conveyor, said conveyor being operated at a speed to continuously remove said predetermined number of containers per minute said chute and rails functioning to bunch the containers at the lower end of the chute whereby the containers are deposited on said conveyor means and said overlaying canvas end serving to smoothly transfer the bunched containers from the chute to the conveyor.

2. A machine for compacting a material in a container and conveying the container along its path comprising a means to feed containers filled with the material, an inclined chute to receive said containers, a canvas surface affixed to said chute, said canvas surface extending beyond the lower end of said chute, means to vibrate said chute, and means to receive the containers passing from said chute.

3. A machine for compacting a material in a container and conveying the container along its path comprising an inclined chute to receive said containers, a flexible surfacing material affixed to said chute throughout the surface over which the containers pass, said flexible surfacing material extending beyond the lower end of the chute, means to vibrate said chute, means to continuously receive containers passing from said chute and said extending end of the flexible material overlaying said last named means to receive the containers.

4. A machine for compacting a material in a container and conveying the container along its path comprising an inclined chute to receive said containers, a flexible surfacing material affixed to said chute throughout the surface over which the container passes, said flexible surfacing material extending beyond the lower end of the chute, said chute having rails provided on each side thereof, means to vibrate said chute at a speed to cause the containers to move over its surface, a conveyor means to receive the containers passing from said chute, said extending end of the flexible material overlaying said conveyor, said conveyor being operated at a speed to remove a predetermined number of containers per minute, said chute being inclined at an angle and vibrated with such energy that more than said predetermined number of containers will pass down its surface per minute, whereby said chute and rails function to bunch the containers at the lower end of the chute whereby the containers are deposited on said conveyor means in a predetermined pattern and said extending end of flexible material serving to transfer the containers smoothly from the chute to the conveyor.

5. A machine for compacting a material in a substantially cylindrical container and conveying the container along its path comprising means to feed containers filled with the material, an inclined chute to receive said containers in standing position, a flexible surfacing material affixed to said chute throughout the surface over which the containers pass, said flexible surfacing material extending beyond the lower end of the chute a distance less than the diameter of the bottom of the individual containers, means to vibrate said chute, and driven means to receive the containers passing from said chute in standing position.

LOWELL R. NEWTON.